May 30, 1967 E. O. DICHTL ET AL 3,321,860

RELIEF POSTCARD

Filed March 15, 1965

INVENTORS
ERWIN OSKAR DICHTL
BY FRIEDRICH HELMUT GEORG NIRSCHL

ATTORNEY

United States Patent Office 3,321,860
Patented May 30, 1967

3,321,860

RELIEF POSTCARD

Erwin O. Dichtl, Yorkstrasse 1c, and Friedrich H. G. Nirschl, Walter-Flex Strasse 2, both of Munich, Germany Filed Mar. 15, 1965, Ser. No. 439,713
Claims priority, application Germany, Mar. 19, 1964, D 43,934
12 Claims. (Cl. 40—160)

Figure 1:
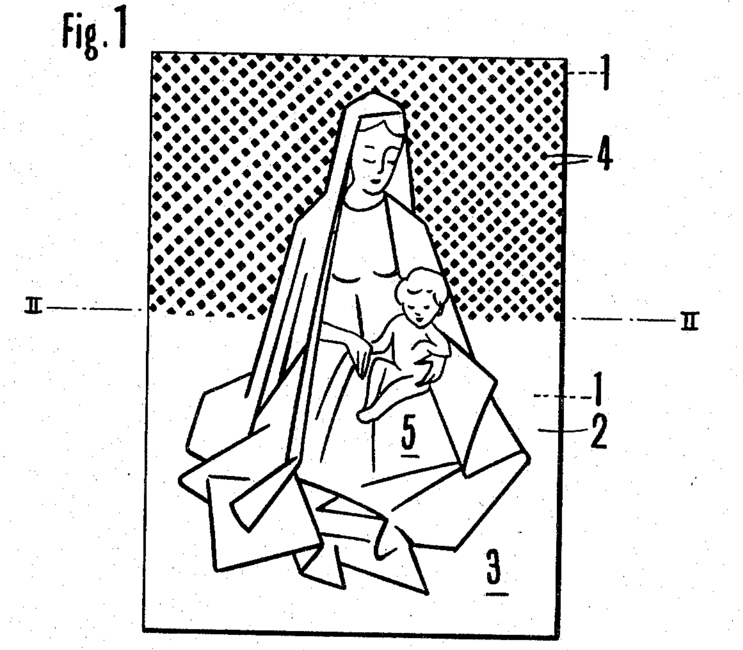

The present invention refers to a relief postcard or a similar relief plate consisting of a cardboard sheet and a layer of plastic arranged on the outside thereof.

In a larger number of fields of use, plates, cards or the like, consisting of a carboard sheet, are developed in relief for technical or esthetic reasons. In order in this connection to protect the cardboard sheet or to stiffen the relief design or prevent it being rubbed away, it is known to apply to the outside of the sheet of cardboard a layer of plastic, for instance, a synthetic resin varnish or a plastic sheet which is heat-sealed to the cardboard sheet. Thus, it is known, for example, to provide the surface of a postcard which is covered with a layer of plastic with a relief pattern consisting of the sound grooves of a phonograph record so that the sound grooves can be played back on a phonograph the same way as an ordinary phonograph record.

It is also already known to produce relief-like bodies from a plastic sheet by known plastics processing methods such as deep-drawing or injection molding. In order to cover the bottom side of the relief, it is also known in this connection to attach a flat covering plate of, for instance, wood or cardboard to the bottom side of said relief body, for instance by gluing.

All of these known cards or plates which are provided with surfaces in relief are developed in such a manner that the relief is not deformable and retains its shape. This non-deformability of the relief results in a number of difficulties which reside essentially in the fact that a large amount of space is necessary for shipment or storage and, for example, ordinary standard envelopes cannot be used. This is particularly disadvantageous in the case of postcards or letter cards, since such relief cards are unsuitable for mailing in ordinary envelopes, since they either do not permit stamping by the post office or else the pattern in relief is damaged by the vigorous stamping. Even when used for other purposes, for instance as cover of book bindings, a considerable amount of space is required for storage and there is the danger that the relief design will be damaged upon careless handling. To make the relief of solid material, which would make it practically insensitive to damage by pressure, although possible, is on the one hand relatively expensive and, on the other hand, results in a relatively high weight, particularly in case of large differences in height in the relief.

The object of the present invention is to create a postcard or similar relief plate from a sheet of cardboard and a layer of plastic applied on the outside thereof, which card when viewing the exposed relief surface shows the relief unchanged while upon packing or even upon unintentional application of pressure, the relief can be pressed flat without damage down into the plane of the low surfaces of the relief. In accordance with the invention, this result is obtained in the manner that the elastically deformable sheet-like plastic layer is embossed in relief in accordance with a design to be shown and is so bonded to the flat sheet of cardboard at the low points of the relief that an exchange of air between the hollow spaces below the elevated parts of the relief and the outer air is possible.

In this connection, the low surfaces of the relief are preferably bonded to the sheet of cardboard either at individual points or else in rhombus-shaped sections spaced apart from each other in a diamond-shaped arrangement. In order to improve the possibility of the replacement of the air and particularly of the emergence of the air upon sudden compression, vent openings can be provided in the sheet of cardboard below the elevated points of the relief.

In order when using relatively thin plastic sheets for relief-like protrusions over a relatively large area to achieve the resiliency necessary for the automatic return of the relief into its proper position after the removal of the load, the relief can be developed in the region of the bulges with bendable supporting elements, the other ends of which rest on or are affixed to the sheet of cardboard, such as strip-like or thread-like supports, etc. The relief-like bulges can be colored in colors which contrast with each other and with the low areas of the relief.

In order to obtain a transparency effect, a transparent plastic sheet and a transparent or translucent cardboard sheet can be used.

One preferred method of producing the relief card consists in printing a plastic sheet which is capable of being drawn with suitable colors, deep-drawing it to form a relief in a deep-drawing press and after the deep-drawing, bonding it to a corresponding sheet of cardboard. The printing can be effected by the silk screen process, by offset or by any other known printing process. In this connection, it must be borne in mind that due to the deep-drawing, the ink cover is changed so that upon printing the density of the color must be suitably selected.

Another method of producing the relief card of the invention consists in forming the relief card by injection molding or by the powder-compressing method and thereupon bonding it to the cardboard sheet. Particularly when the relief card of the invention is used for the production of book bindings, the plastic relief sheet can be produced by the powder-compressing method with a colored mixed powder in such a manner that a marbled or otherwise patterned surface is produced.

The invention will be explained in further detail by the following examples read with reference to the drawings.

Figure 2:
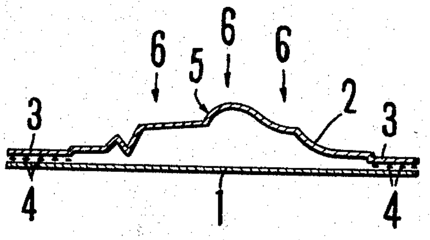
Figure 3:
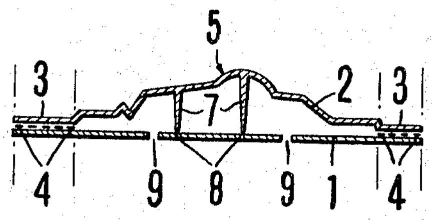

In the drawings:

FIGURE 1 is a top view of a relief plate in accordance with the invention which can be used as postcard or as book cover, FIGURE 2 is a section along the line II—II of FIGURE 1, and FIGURE 3 is an edge view similar to FIGURE 2, through a modified form of the relief plate of the invention.

The relief plate shown in FIGURES 1 and 2 consists of a flat cardboard sheet 1 and of a plastic sheet 2 which has been embossed in relief. The plastic sheet 2 is bonded at the low areas 3 of the relief at a plurality of points 4. In the regions lying between the bonding points 4, the plastic sheet 2 rests on the cardboard sheet 1 only by its inherent elasticity.

In the central region 5 the plastic sheet bears a relief pattern, in the present case in the form of a Madonna relief. Before the embossing, the plastic sheet 2 was printed with the colors corresponding to the picture. In this way there is produced in the case of the postcard shown in FIGURE 1, a colored Madonna relief 5 on a background colored in a specific color and formed of the low areas 3 of the relief.

Due to the elastic deformability of the plastic sheet 2, the relief-like bulging 5 is pressed flat against the cardboard sheet 1, a corresponding pressure being exerted in the direction indicated by the arrows 6, for instance, upon insertion into an envelope, so that the postcard has within the envelope the shape of a normal letter card. When used, for instance, as a book cover, the book can also be inserted in an ordinary package whereby the relief-like bulging 5 is correspondingly flattened. Upon the removal of the pressure acting in the direction of the arrows 6, the relief again returns into its original relief form due to the inherent elasticity of the plastic. The air enclosed between relief-like arching 5 and the cardboard sheet 1 can escape through the slit-like channels remaining between the bonding points 4 and drawn in again when the relief is bulged out.

In order, when using a relatively thin plastic-sheet material or in the case of a surface 5 which is very arched very substantially as compared with the thickness of the plastic material, to be certain of obtaining the required resiliency for the completely rubber-like arching back of the relief portion 5, there can be provided—as shown in FIG. 3—on the inside of the relief-like arching 5 one or more supports 7 which are glued at 8 to the cardboard sheet or else rest freely on the cardboard sheet. When pressed flat, the support 7, which may, for instance, have the shape of a thin bar or of a thread-like column, places itself flat under the inward pressed relief surface 5 on the cardboard sheet and after the removal of the pressure on the relief, acts practically as a restoring spring as a result of its inherent elasticity. In order, in case of very high arching of the relief section 5 and thus a correspondingly large volume of air between the relief section 5 and the cardboard sheet 1, to make possible a rapid escape of the air, one or more vent openings 9 can be provided in the cardboard sheet in the region of the relief section 5. When using the relief plate of the invention, for instance, as comic postcard, known whistle devices, such as used in rubber dolls, can be inserted as known in the vent openings. Then a whistle can be produced by pressing brifly on the relief-like projection.

The glue points 4 can also be provided in the form of strips extending diagonal or parallel to two opposite side edges of the plate or in rhombus-like sections spaced apart from each other in a diamond-like pattern.

As relief layer 2 there can be used any elastically deformable sheet-like material. As base layer 1 there can be used, instead of a sheet of cardboard, also any other corresponding sheet-shaped material having the required stiffness. The bonding can be effected by a suitable selection of the materials also by heat-sealing, in which connection, however, as a rule, the clamping places of the heat-sealing will be visible on the surface of the plastic sheet. If, for instance, rhombus-shaped heat-sealing regions arranged in a diamond pattern are used, an additional shaping of the low areas of the relief can, possibly, thereby be obtained.

The method in accordance with the invention is particularly well suited for mass production on rotary machines in which, by operations the individual steps of which are known, a web-shaped plastic sheet can be printed, embossed, glued or heat-sealed to the cardboard material which is also in the form of a web and thereupon cut out. As printing method there can be used practically all known methods of printing, the silk-screen process being suitable in particular for the individual production of quality postcards, book covers or the like.

In order to use the relief plate, for instance, as lantern pane or as window picture, a transparent plastic sheet which is printed with correspondingly transparent inks and a transparent cardboard sheet or a transparent plastic board are used. In order to obtain a particularly striking effect, the cardboard sheet can also be covered on the side facing the relief with a layer of a silvery luster, for instance, with aluminum foil. When using a transparent relief 2 with correspondingly transparent inks, a special effect is obtained in this way. Similarly, for instance, a special effect can be obtained by backing with a cardboard sheet which has a dark color on its top side.

Having thus described the invention and illustrated its use, what we claim as new and desire to secure by Letters Patent is:

1. Relief postcard or similar relief plate comprised of a relatively stiff backing sheet and a plastic layer applied to the outside of said backing sheet and spaced from it and connected to it only at individual points, characterized by the fact that the sheet-like layer (2) consists of elastically deformable material and is shaped in relief corresponding to a raised pattern (5) which is to be represented and is so glued in the low areas (3) of the relief to the backing sheet (1) that an equalization of pressure takes place between the cavities below the relief elevations and the atmosphere through the spaces between the glue points (4).

2. Relief postcard or the like according to claim 1, characterized by the fact that the relief layer (2) is glued at individual points in the low areas (3) of the relief to the backing sheet (1).

3. Relief postcard or the like according to claim 1, characterized by the fact that the relief layer (2) is bonded in the low areas (3) of the relief to the backing sheet in rhombus-like sections spaced apart from each other in a diamond-like pattern.

4. Relief postcard or the like according to claim 1, characterized by the fact that below at least some of the raised pattern regions (5) of the relief, vent openings are provided in the backing sheet.

5. Relief postcard or the like according to claim 1, characterized by the fact that in the raised pattern regions (5) there are developed on the relief layer elastically flexible supporting elements, such as strip-shaped bars or the like, the free ends of which rest on the backing sheet.

6. Relief plate such as a postcard or the like according to claim 1, characterized by the fact that the raised pattern regions (5) are colored in colors which contrast with each other and with the low areas of the relief.

7. A relief postcard or the like in accordance with claim 1 wherein said backing sheet is formed of a material which permits the passage of light therethrough.

8. The method of producing a relief postcard or the like which may be stored in generally flat form, which comprises the steps of providing an elastically deformable plastic sheet, deforming said sheet to define a relief pattern therein including portions raised from the level of the original contour of said sheet, providing a relatively stiff backing sheet, and thereafter bonding said deformed plastic sheet to said backing sheet at spaced points to define pressure equalization paths between said spaced points leading to the raised portions of said sheet.

9. A method in accordance with claim 8, wherein said deformable sheet is imprinted with colors prior to said deforming step.

10. The method in accordance with claim 9 wherein said imprinting is effected by the silk screen process.

11. The method in accordance with claim 9 wherein said imprinting is effected by the offset printing process.

12. The method of claim 8 wherein said deformable sheet is of a variegated color.

References Cited

UNITED STATES PATENTS

| | | | |
|---|---|---|---|
| 2,468,731 | 5/1949 | Borkland | 40—1 X |
| 2,515,804 | 7/1950 | Shuffer | 46—35 |

FOREIGN PATENTS

| | | |
|---|---|---|
| 1,054,769 | 10/1953 | France. |

EUGENE R. CAPOZIO, *Primary Examiner.*

W. J. CONTRERAS, *Assistant Examiner.*